US012784583B2

(12) United States Patent
Hayakawa et al.

(10) Patent No.: US 12,784,583 B2
(45) Date of Patent: Nov. 3, 2026

(54) SERVER APPARATUS

(71) Applicant: SUBARU CORPORATION, Tokyo (JP)

(72) Inventors: Kazuhiro Hayakawa, Tokyo (JP); Ryota Nakamura, Tokyo (JP); Junichi Motoyama, Tokyo (JP); Tsukasa Mikuni, Tokyo (JP); Takuya Homma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 180 days.

(21) Appl. No.: 18/448,399

(22) Filed: Aug. 11, 2023

(65) Prior Publication Data

US 2024/0087449 A1 Mar. 14, 2024

(30) Foreign Application Priority Data

Sep. 8, 2022 (JP) ................................ 2022-143323

(51) Int. Cl.

| | |
|---|---|
| ***G08G 1/00*** | (2006.01) |
| ***G08G 1/01*** | (2006.01) |
| ***G08G 1/017*** | (2006.01) |

(52) U.S. Cl.

CPC ......... *G08G 1/0141* (2013.01); *G08G 1/0108* (2013.01); *G08G 1/0133* (2013.01); *G08G 1/017* (2013.01)

(58) Field of Classification Search

CPC .. G08G 1/0141; G08G 1/0108; G08G 1/0133; G08G 1/0177

See application file for complete search history.

(56) References Cited

U.S. PATENT DOCUMENTS 10,176,524 B1 * 1/2019 Brandmaier ......... G08G 1/0129
2016/0275790 A1 9/2016 Kang et al.
(Continued)

FOREIGN PATENT DOCUMENTS

JP 2001-109974 A 4/2001
JP 2005-284666 A 10/2005
(Continued)

OTHER PUBLICATIONS

Office Action dated Jun. 2, 2026, in corresponding Japanese Application No. JP2022-143323.

*Primary Examiner* — Truc M Do
(74) *Attorney, Agent, or Firm* — Rimon P.C.

(57) ABSTRACT

A server apparatus includes a collection unit, an identification unit, an ID information generation unit, a storage, a determination unit, and a notification unit. The collection unit performs, when an accident occurs, communication connection with a surrounding vehicle including an accident vehicle or a portable device and collect accident information therefrom. The identification unit identifies the accident vehicle based on the collected accident information. The ID information generation unit generates ID information for the accident associated with information regarding the identified accident vehicle. The storage holds a database in which the ID information and the accident information are associated with each other. The determination unit determines that the accident involves multiple vehicles when the database includes multiple pieces of the identical ID information. The notification unit notifies a requester of the accident information associated with the ID information when it is determined that the accident involving the multiple vehicles occurs.

10 Claims, 6 Drawing Sheets

(56) References Cited

U.S. PATENT DOCUMENTS

| | | | | |
|---|---|---|---|---|
| 2018/0197409 | A1* | 7/2018 | Youm | G08B 25/10 |
| 2018/0299284 | A1* | 10/2018 | Wang | G08G 1/0112 |
| 2020/0234577 | A1* | 7/2020 | Hasegawa | H04W 4/90 |
| 2020/0260239 | A1* | 8/2020 | Ahn | G08G 1/0112 |
| 2020/0334927 | A1* | 10/2020 | Rozint | B60R 21/0136 |
| 2021/0217096 | A1 | 7/2021 | Usami | |

FOREIGN PATENT DOCUMENTS

| | | | |
|---|---|---|---|
| JP | 2007-086858 | A | 4/2007 |
| JP | 2009-165021 | A | 7/2009 |
| JP | 2010-244167 | A | 10/2010 |
| JP | 2015-207049 | A | 11/2015 |
| JP | 2015-230579 | A | 12/2015 |
| JP | 2019-185453 | A | 10/2019 |
| JP | 2021-033574 | A | 3/2021 |
| WO | 2019/221163 | A1 | 11/2019 |

* cited by examiner

| VEHICLE | VEHICLE INFORMATION | |
|---|---|---|
| | CHASSIS FRAME NUMBER | VEHICLE IDENTIFICATION NUMBER |
| 100_A | a1 | a2 |
| 100_B | b1 | b2 |
| 100_C | c1 | c2 |
| ⋮ | ⋮ | ⋮ |
| 100_Z | z1 | z2 |

FIG. 4A

| CHASSIS FRAME NUMBER | ID INFORMATION |
|---|---|
| a1 | XabcY |
| b1 | |
| c1 | |
| a1, b1 | |
| b1, c1 | |
| a1, b1, c1 | |

FIG. 4B

| ID INFORMATION | ACCIDENT INFORMATION |
|---|---|
| XabcY | ! ! ! ! |
| XabcY | # # # # |
| XabcY | $ $ $ $ |
| XbcdY | & & & & |
| XaceY | ? ? ? ? |

FIG. 5

SERVER APPARATUS

CROSS-REFERENCE TO RELATED APPLICATIONS

The present application claims priority from Japanese Patent Application No. 2022-143323 filed on Sep. 8, 2022, the entire contents of which are hereby incorporated by reference.

BACKGROUND

The disclosure relates to a server apparatus.

Various notification systems to be applied to vehicles have been put into practical use. When an emergency such as a traffic accident or a malfunction of a vehicle occurs, a notification system sends an emergency notification indicating the state of the emergency via a mobile communication network of a mobile phone, an in-vehicle phone, or another in-vehicle communication device.

An example of the notification system described above is disclosed in, for example, Japanese Unexamined Patent Application Publication (JP-A) No. 2010-244167. In order to inform an emergency center of details of a contact accident, an emergency notification system disclosed in JP-A 2010-244167 includes a pedestrian accident information sensor, an occupant accident information sensor, and an accident information transmission part. The pedestrian accident information sensor detects pedestrian accident information to determine a circumstance upon contact between a pedestrian and a vehicle. The occupant accident information sensor detects occupant accident information to determine a circumstance upon occurrence of danger to an occupant due to contact of the vehicle. When determining contact with the pedestrian, the accident information transmission part sends the pedestrian accident information to a communication device of the emergency center. When determining the occurrence of danger to the occupant, the accident information transmission part sends the occupant accident information to the communication device.

In some cases, an accident vehicle may not include a device that is able to communicate with a base station. For collecting accident information from a region around an accident site in such a case, the following technique is disclosed. When an accident vehicle that has caused an accident or a base station detects occurrence of the accident, the accident vehicle or the base station generates an individual ID for each accident. The accident vehicle or a narrow-region communication base station generates an image saving request including the ID, and sends the generated image saving request to a wireless communication region around the own vehicle or to a service region of the own station. A surrounding vehicle that receives the image saving request within the wireless communication region or the service region extracts the ID included in the received image saving request, and reads image data from a temporary recorder in which latest image data for a predetermined time including captured images of a region around the own vehicle is recorded. The surrounding vehicle associates the ID and the image data read out from the temporary recorder, and store the associated ID and image data as accident information in an accident information storage. For example, reference is made to Japanese Unexamined Patent Application Publication (JP-A) No. 2009-165021.

SUMMARY

An aspect of the disclosure provides a server apparatus that includes a collection unit, an identification unit, an ID information generation unit, a storage, a determination unit, and a notification unit. The collection unit is configured to, when an accident occurs, perform communication connection with a surrounding vehicle or a portable device and collect accident information from the surrounding vehicle or the portable device. The surrounding vehicle includes an accident vehicle. The identification unit is configured to identify the accident vehicle based on the accident information collected. The ID information generation unit is configured to generate ID information for the accident associated with information regarding the accident vehicle identified. The storage is configured to hold a database in which the ID information and the accident information collected by the collection unit are associated with each other. The determination unit is configured to determine that the accident is an accident involving multiple vehicles when the database includes multiple pieces of the ID information that are identical to each other. The notification unit is configured to notify a requester of the accident information associated with the ID information when it is determined that the accident involving the multiple vehicles occurs. The requester includes one or more of an emergency notification center, an emergency life-saving organization requesting information, and an insurance company requesting information.

An aspect of the disclosure provides a server apparatus that includes circuitry. The circuitry is configured to perform, when an accident occurs, communication connection with a surrounding vehicle or a portable device and collect accident information from the surrounding vehicle or the portable device. The surrounding vehicle includes an accident vehicle. The circuitry is configured to identify the accident vehicle based on the accident information collected. The circuitry is configured to generate ID information for the accident associated with information regarding the accident vehicle identified. The circuitry is configured to store, in a storage, a database in which the ID information and the accident information are associated with each other. The circuitry is configured to determine that the accident is an accident involving multiple vehicles when the database includes multiple pieces of the ID information that are identical to each other. The circuitry is configured to notify a requester of the accident information associated with the ID information upon determining that the accident involving the multiple vehicles occurs. The requester includes one or more of an emergency notification center, an emergency life-saving organization requesting information, and an insurance company requesting information.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 4A is a diagram illustrating an example of a relationship between the vehicle and vehicle information in the server apparatus according to the example embodiment of the disclosure.

FIG. 4B is a diagram illustrating an example of a relationship between the vehicle information and ID information in the server apparatus according to the example embodiment of the disclosure.

FIG. 5 is a diagram illustrating an example of a database in the server apparatus according to the example embodiment of the disclosure.

DETAILED DESCRIPTION

Figure 1:
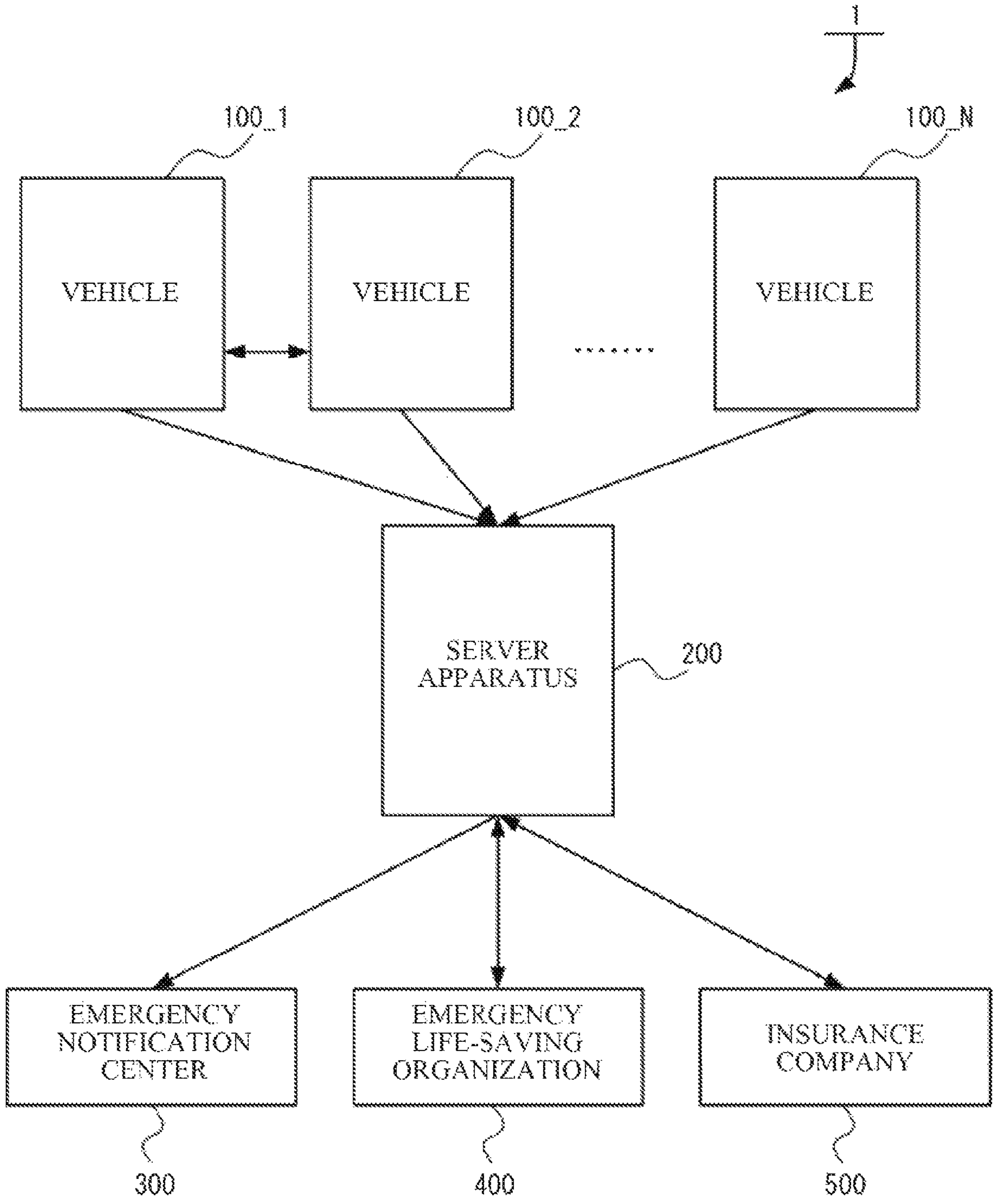
FIG. 1 is a diagram illustrating a configuration of an emergency notification system that is to use a server apparatus according to one example embodiment of the disclosure.

As described in JP-A No. 2010-244167, when an accident involving vehicles occurs, information regarding details of the accident is to be provided to an organization such as an emergency notification center. A technique disclosed in JP-A No. 2009-165021 seems to appropriately deal with such a situation.

In the technique disclosed in JP-A No. 2009-165021, however, data to be used by the organization such as the emergency notification center is stored in an accident information storage of each surrounding vehicle.

For this reason, when acquiring information regarding the details of the accident from many pieces of information, the organization such as the emergency notification center is to access each of the surrounding vehicles and collect information therefrom. This can make it difficult for the organization such as the emergency notification center to promptly perform a determination or a procedure.

It is desirable to provide a server apparatus that makes it possible to secure prompt and accurate performance of a determination and a procedure upon occurrence of an accident involving multiple vehicles.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

A description is given below of a server apparatus 200 according to an example embodiment of the disclosure, with reference to FIGS. 1 to 6.

In the following, an emergency notification system 1 is used to describe about the server apparatus 200 according to the example embodiment.

[Configuration of Emergency Notification System 1]

As illustrated in FIG. 1, the emergency notification system 1 according to the example embodiment may include vehicles 100_1 to 100_N, the server apparatus 200, an emergency notification center 300, an emergency life-saving organization 400, and an insurance company 500.

The vehicles 100_1 to 100_N may be surrounding vehicles including an accident vehicle, and may be configured to communicate with the server apparatus 200 which will be described later.

The vehicles 100_1 to 100_N may be configured to communicate also with a vehicle irrelevant to the accident via a particular line, for example.

According to the example embodiment, when an accident occurs, the vehicles 100_1 to 100_N may send information regarding the accident to the server apparatus 200. Non-limiting examples of the information regarding the accident may include information regarding a state of a contact, information regarding a place of the contact, information regarding an image, and information regarding audio data that are stored in a storage of each of the vehicles 100_1 to 100_N.

In the example embodiment, a description is given with reference to an example case where a supplier that supplies the information regarding the accident to the server apparatus 200 includes the vehicles 100_1 to 100_N. However, the supplier that supplies the information regarding the accident to the server apparatus 200 may include any portable device such as a smartphone or a wearable device.

The server apparatus 200 may perform unified management of accident information among the vehicles 100_1 to 100_N that are the suppliers of the accident information, and the emergency notification center 300, the emergency life-saving organization 400, the insurance company 500, and any other party that are requesters of the accident information. The server apparatus 200 may thus serve to allow the emergency notification center 300, the emergency life-saving organization 400, the insurance company 500, or any other party to promptly and accurately perform a procedure.

The emergency notification center 300 may receive the accident information from the server apparatus 200, and may send a notification regarding the accident information to a person in charge. When receiving the notification, the person in charge may send a notification to a fire station, a police station, a hospital, or any other organization selected depending on the details of the accident.

The emergency life-saving organization 400 may be a medical emergency organization that treats a patient in a serious condition. Upon treating such a patient, the emergency life-saving organization 400 may request the server apparatus 200 to provide information such as information regarding the details of the accident or information regarding whether the patient has an underlying disease.

The insurance company 500 may be an insurance company for an automobile insurance. The insurance company 500 may request the server apparatus 200 to provide information related to payment for insurance such as information regarding whether a policyholder suffers an injury, information regarding an injury condition of the policyholder, information regarding a damage condition of an automobile, or information to be used for arrangement with a repair shop.

[Configuration of Vehicle 100]

Figure 2:
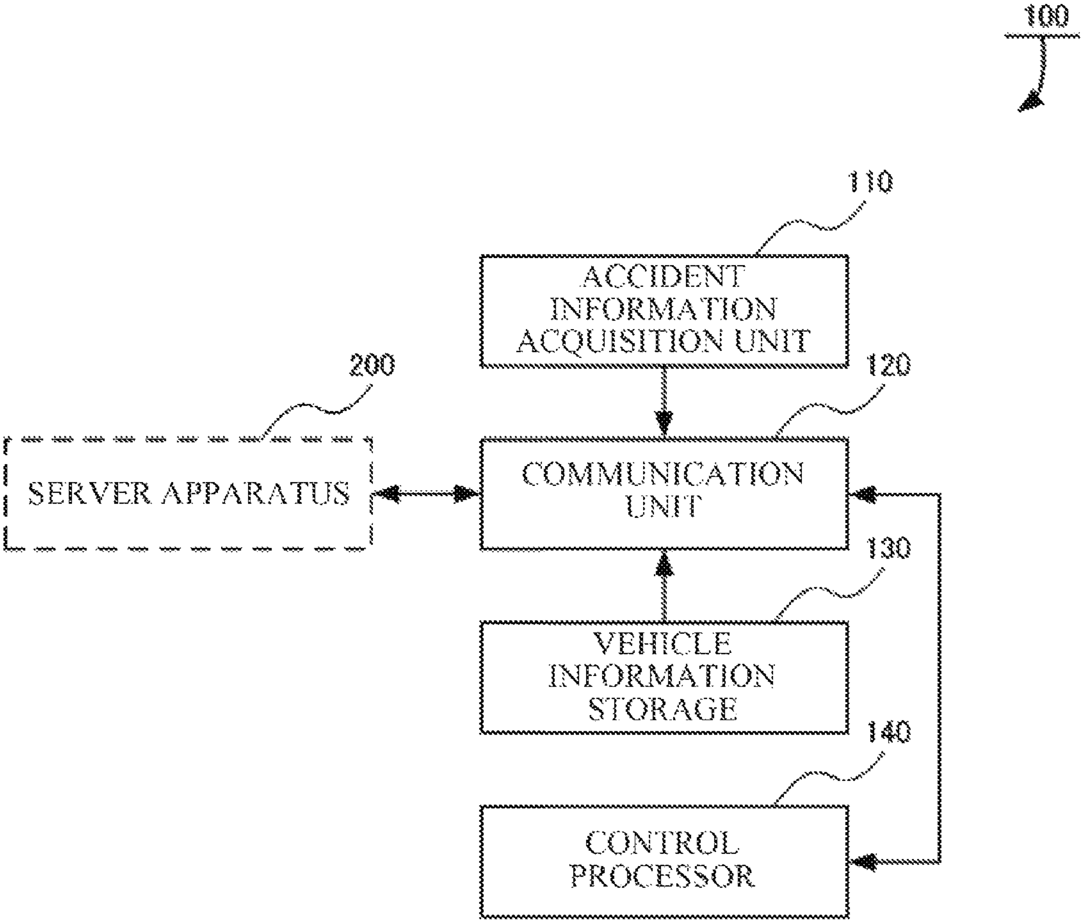
FIG. 2 is a diagram illustrating a configuration of a vehicle according to the example embodiment of the disclosure.

As illustrated in FIG. 2, the vehicle 100 according to the example embodiment may include an accident information acquisition unit 110, a communication unit 120, a vehicle information storage 130, and a control processor 140.

The accident information acquisition unit 110 may acquire, for example but not limited to, an image captured by an imaging device to be used in an advanced driver-assistance system (ADAS), an image of a region around each of the vehicles 100_1 to 100_N captured by a drive recorder, own vehicle position information obtained by a navigation system, audio data collected by a device such as a microphone, and any other information, as the accident information.

The communication unit 120 may be, for example, a communication module configured to communicate with the server apparatus 200. Non-limiting examples of a communication form of the communication unit 120 may include Wi-Fi (registered trademark).

For example, upon reception of a request for transmission of the accident information made by the server apparatus 200, the communication unit 120 may send the accident information acquired by the accident information acquisition unit 110 and vehicle information of the own vehicle stored in the vehicle information storage 130 which will be described later.

The vehicle information storage 130 may store the vehicle information of the own vehicle.

Non-limiting examples of the vehicle information may include a chassis frame number and a vehicle identification number (VIN).

The control processor 140 may control an overall operation of the vehicle 100 in accordance with a control program stored in an unillustrated read only memory (ROM), for example. For example, upon the reception of the request for transmission of the accident information made by the server apparatus 200, the control processor 140 may perform a control that allows the accident information acquired by the accident information acquisition unit 110 and the vehicle information of the own vehicle stored in the vehicle information storage 130 to be sent to the server apparatus 200.

[Configuration of Server Apparatus 200]

Figure 3:
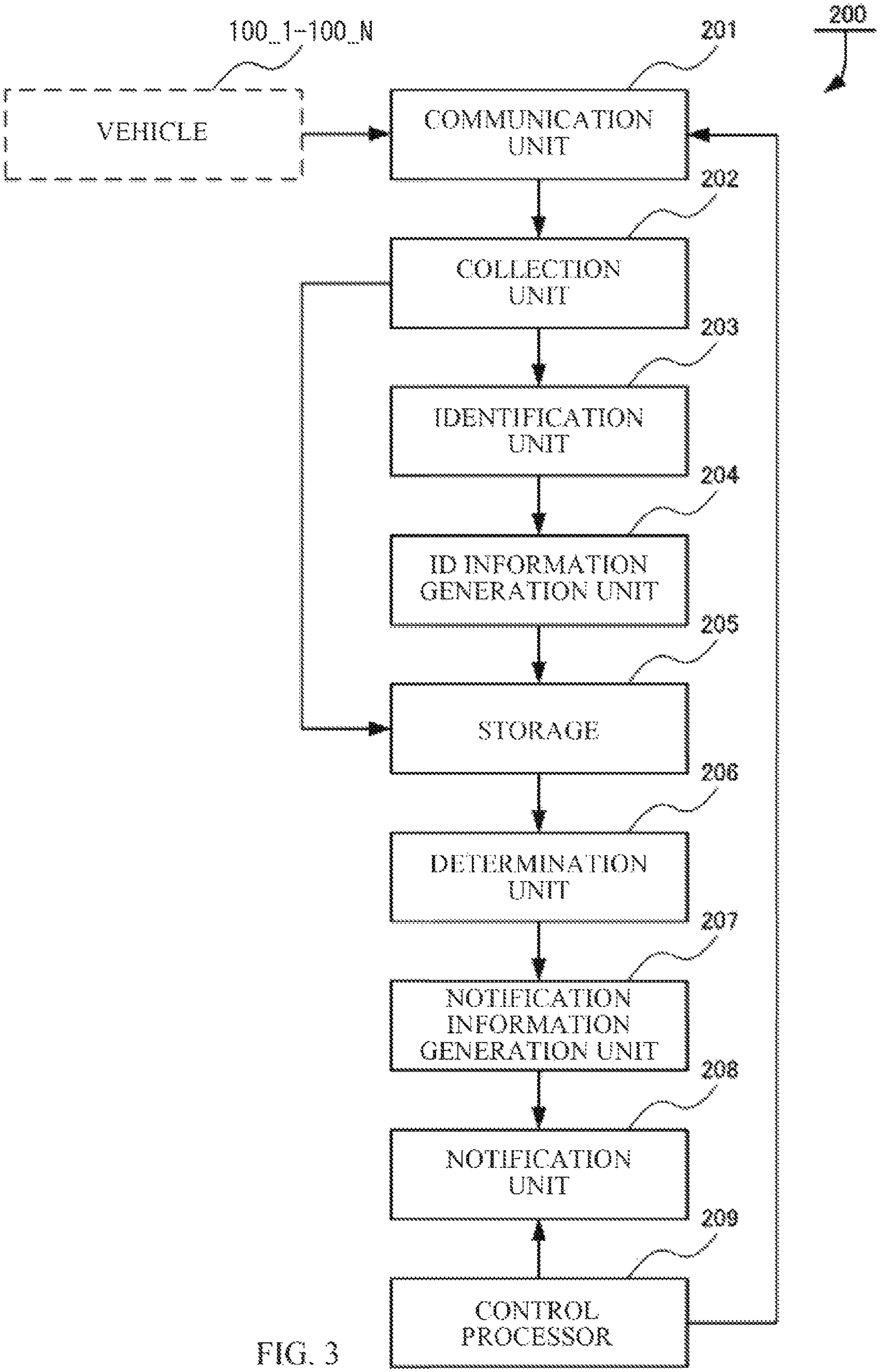
FIG. 3 is a diagram illustrating a configuration of the server apparatus according to the example embodiment of the disclosure.

As illustrated in FIG. 3, the server apparatus 200 according to the example embodiment may include a communication unit 201, a collection unit 202, an identification unit 203, an ID information generation unit 204, a storage 205, a determination unit 206, a notification information generation unit 207, a notification unit 208, and a control processor 209.

The communication unit 201 may be, for example, a communication module configured to communicate with the vehicles 100_1 to 100_N including the accident vehicle or a portable device. Non-limiting examples of a communication form of the communication unit 201 may include Wi-Fi (registered trademark).

For example, the communication unit 201 may start based on a control signal from the control processor 209, and may receive the accident information from any of the surrounding vehicles 100_1 to 100_N including the accident vehicle or the portable device.

The communication unit 201 may sequentially send respective pieces of the accident information received from the vehicles 100_1 to 100_N to the collection unit 202 which will be described later.

The collection unit 202 may collect the accident information which the communication unit 201 receives from any of the surrounding vehicles (the vehicles 100_1 to 100_N) including the accident vehicle or the portable device when the accident occurs.

The collection unit 202 may examine the accident information in terms of, for example but not limited to, position information related to each of the vehicles 100_1 to 100_N providing the accident information or the sameness of the date and time of image capturing among the captured images.

The identification unit 203 may identify the accident vehicle based on the collected pieces of accident information.

For example, the identification unit 203 may identify vehicle information of the accident vehicle based on number information among the collected pieces of accident information. The number information may be obtained based on an image analysis performed on the images captured by the imaging devices to be used in the ADAS in the vehicles 100_1 to 100_N, and a number plate image of a damaged vehicle that is included in the images of regions around the vehicles 100_1 to 100_N captured by the drive recorders in the vehicles 100_1 to 100_N.

The identification unit 203 may supply the information regarding the identified accident vehicle to the ID information generation unit 204 which will be described later.

The ID information generation unit 204 may generate ID information related to the accident associated with the information regarding the accident vehicle identified by the identification unit 203.

Here, non-limiting examples of the information regarding the accident vehicle may include information unique to a vehicle such as a chassis frame number or a vehicle identification number (VIN). For example, the vehicle and the vehicle information such as the chassis frame number or the vehicle identification number (VIN) may be associated with each other, as presented in FIG. 4A. The vehicle and the vehicle information may also be associated with the number information.

In addition, the ID information generation unit 204 may generate ID information such as that presented in FIG. 4B, as the ID information related to the accident associated with the information regarding the accident vehicle.

For example, when the accident involves three vehicles 100_1, 100_2, and 100_3, the same ID information "XabcY" may be given to three kinds of accident information: collected information including an image capturing all of the three vehicles 100_1, 100_2, and 100_3; collected information including an image capturing two of the three vehicles 100_1, 100_2, and 100_3; and collected information capturing one of the three vehicles 100_1, 100_2, and 100_3.

The storage 205 may hold a database in which the ID information generated by the ID information generation unit 204 and at least the accident information collected by the collection unit 202 are associated with each other.

For example, the storage 205 may hold a database such as that presented in FIG. 5.

Note that in one example, diagnosis information such as individual number (my number) information or medical record information may further be associated with the ID information and the accident information in the database.

The determination unit 206 may determine that the accident involves multiple vehicles when the database stored in the storage 205 includes multiple pieces of the ID information that are identical to each other. That is, as described above, for example, when the accident involves three vehicles 100_1, 100_2, and 100_3, the identical ID information "XabcY" may be given to three kinds of accident information: collected information including an image capturing all of the three vehicles 100_1, 100_2, and 100_3; collected information including an image capturing two of the three vehicles 100_1, 100_2, and 100_3; and collected information capturing one of the three vehicles 100_1, 100_2, and 100_3.

In other words, when the accident simply involves one vehicle 100_1, even if many pieces of accident information are obtained from multiple vehicles 100_2 to 100_N, the obtained pieces of accident information may be regarded as one group, and may be given one ID information.

Accordingly, when the database stored in the storage 205 involves multiple pieces of the ID information that are identical to each other, it may be considered that the accident involves multiple vehicles.

The notification information generation unit 207 may sort out the pieces of accident information collected by the collection unit 202, and generate information for notification.

Here, non-limiting examples of "sorting out" the pieces of accident information may include a process of increasing accuracy of information regarding, for example, the number of vehicles involved in the accident and the number of injured persons involved in the accident. Such a process of increasing the accuracy of the information may include, for example, removing duplicate pieces of information from the pieces of information collected from the surrounding vehicles 100_1 to 100_N including the accident vehicle or the portable device, and combining multiple pieces of information.

When occurrence of an accident involving multiple vehicles is determined, the notification unit 208 may notify the requester of the accident information associated with the ID information. The requester may include the emergency notification center 300, the emergency life-saving organization 400 requesting information, and the insurance company 500 requesting information.

For example, the requester including, without limitation, the emergency life-saving organization 400 and the insurance company 500 may present the ID information obtained from the emergency notification center 300 and thereby request information.

The control processor 209 may control an overall operation of the server apparatus 200 based on a control program stored in an unillustrated read only memory (ROM), for example.

In the example embodiment, when receiving a request for information with the presented ID information from the requester such as the emergency life-saving organization 400 or the insurance company 500, the control processor 209 may control the notification unit 208 to notify the requester of the accident information associated with the ID information.

[Process to be Performed by Server Apparatus 200]

Figure 6:
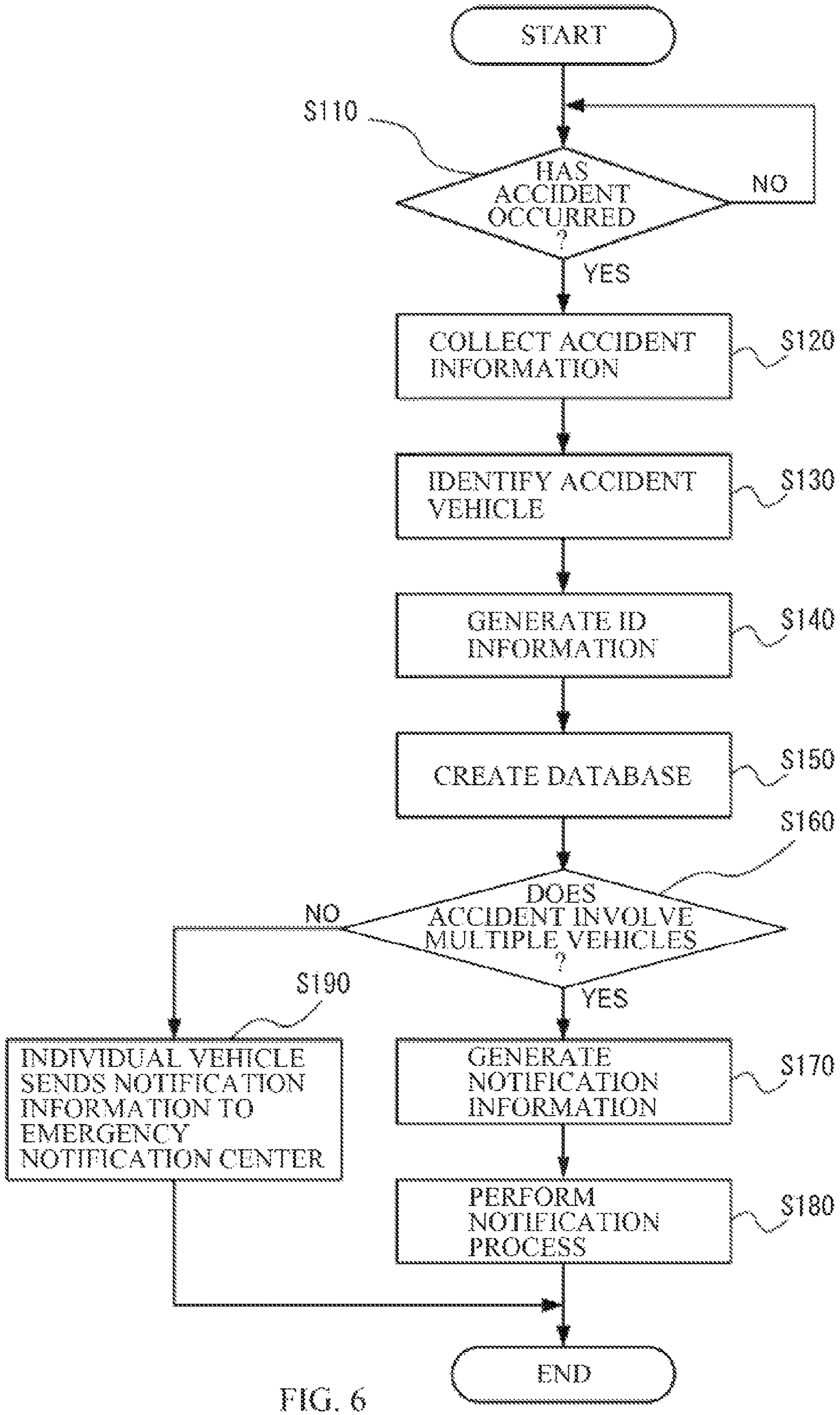
FIG. 6 is a diagram illustrating a process to be executed by the server apparatus according to the example embodiment of the disclosure.

A description is given of a process to be performed by the server apparatus 200 according to the example embodiment, with reference to FIG. 6.

As illustrated in FIG. 6, the control processor 209 may determine whether an accident has occurred (Step S110). If the control processor 209 determines that no accident has occurred (Step S110: NO), the process may return to a stand-by mode.

In contrast, if the control processor 209 determines that an accident has occurred (Step S110: YES), the collection unit 202 may collect pieces of accident information which the communication unit 201 receives from the surrounding vehicles 100_1 to 100_N including the accident vehicle or the portable device (step S120).

Thereafter, the identification unit 203 may identify the accident vehicle based on the collected pieces of accident information (step S130).

The ID information generation unit 204 may generate the ID information related to the accident associated with the information regarding the accident vehicle identified by the identification unit 203 (step S140).

Thereafter, a database in which the ID information generated by the ID information generation unit 204 and at least the pieces of accident information collected by the collection unit 202 are associated with each other may be created, and the created database may be stored in the storage 205 (step S150).

If the database stored in the storage 205 includes multiple pieces of the ID information that are identical to each other, the determination unit 206 may determine that the accident involves multiple vehicles (step S160).

If the determination unit 206 determines that the occurred accident is an accident involving multiple vehicles (step S160: YES), the notification information generation unit 207 may sort out the pieces of accident information collected by the collection unit 202 and thereby generate notification information (step S170). If the occurrence of the accident involving multiple vehicles is determined, the notification unit 208 may send the notification information associated with the ID information and generated by the notification information generation unit 207 to the requester including, without limitation, the emergency notification center 300, the emergency life-saving organization 400 requesting information, and the insurance company 500 requesting information (step S180). Thereafter, the process may be ended.

If the determination unit 206 determines that the occurred accident is not an accident involving multiple vehicles (step S160: NO), the vehicle may individually send the notification information generated by the notification information generation unit 207 to the emergency notification center (step S190). Thereafter, the process may be ended.

Workings and Example Effects

As described above, the collection unit 202 of the server apparatus 200 of the emergency notification system 1 according to the example embodiment performs, when an accident occurs, communication connection with the surrounding vehicles 100_1 to 100_N or a portable device and collect the accident information from the surrounding vehicles 100_1 to 100_N or the portable device. The surrounding vehicles 100_1 to 100_N includes an accident vehicle. The identification unit 203 identifies the accident vehicle based on the collected accident information. The ID information generation unit 204 generates ID information for the accident associated with information regarding the identified accident vehicle.

The storage 205 holds the database in which the ID information and at least the accident information collected by the collection unit 202 are associated with each other.

That is, the storage 205 may hold a database in which the accident information collected by the collection unit 202 and the ID information related to the accident associated with the information regarding the identified accident vehicle generated by the ID information generation unit 204 are associated with each other.

This allows the server apparatus 200 to perform unified management of the accident information together with the ID information.

When the determination unit 206 of the server apparatus 200 determines that the accident is an accident involving multiple vehicles, the notification information generation unit 207 notifies the requester of the accident information associated with the ID information. The requester includes one or more of the emergency notification center 300, the emergency life-saving organization 400 requesting information, and the insurance company 500 requesting information.

That is, usually, when the accident involves multiple vehicles, the multiple vehicles each individually send a notification to any of the organizations including, without limitation, the emergency notification center 300, the police station, the fire station, the emergency life-saving organization 400, and the insurance company 500.

In such a situation, however, it may be difficult to determine which pieces of information relate to the identical accident. Therefore, each organization may individually collect information, for example, in order to associate the pieces of information with each other.

According to the server apparatus 200 of the emergency notification system 1 of the example embodiment, unified management of the accident information together with the ID information may be performed. This allows for prompt performance of an activity by an organization such as the police station, the fire station, or the emergency life-saving organization 400 after the occurrence of the accident. This allows the process in an organization such as the insurance company 500 to be performed smoothly, appropriately, and without misunderstanding.

The notification information generation unit 207 of the server apparatus 200 of the emergency notification system 1 according to the example embodiment may sort out the accident information collected by the collection unit 202 and thereby generate notification information.

Here, "sorting out" the collected pieces of accident information by the notification information generation unit 207 may include, for example, a process of increasing accuracy of information regarding, for example, the number of vehicles involved in the accident and the number of injured persons involved in the accident. Such a process of increasing the accuracy of the information may include, for example, removing duplicate pieces of accident information from the pieces of information collected from the surrounding vehicles 100_1 to 100_N including the accident vehicle or the portable device, and combining multiple pieces of accident information.

It is therefore possible to secure prompt and accurate information transmission regarding an accident involving multiple vehicles.

In the server apparatus 200 of the emergency notification system 1 according to the example embodiment, the information regarding the accident vehicle may include one or both of the chassis frame number and the vehicle identification number.

It is therefore possible to uniquely identify the accident vehicle.

In addition, the ID information using the above-described information and the accident information collected by the collection unit 202 may be associated with each other. Therefore, for example, the organization such as the emergency life-saving organization 400 or the insurance company 500 may be able to promptly and accurately acquire the desired accident information, for example, by acquiring the ID information, for example, from the emergency notification center 300.

In the server apparatus 200 of the emergency notification system 1 according to the example embodiment, the database may further include the diagnostic information associated with the information regarding the accident vehicle.

For example, this allows the emergency life-saving organization 400 to promptly, and without much trouble, acquire information related to an occupant of the accident vehicle such as a health insurance card number, information regarding a medical history, or information regarding a disease which is being currently treated.

In some embodiments, it is possible to implement the server apparatus 200 of the example embodiment of the disclosure by recording the process to be executed, for example, by the control processor 209 on a non-transitory recording medium readable by a computer system, and causing the computer system to load the program recorded on the non-transitory recording medium, for example, onto the control processor 209 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more example embodiments of the disclosure have an effect that prompt and accurate performance of a determination and a procedure is secured upon occurrence of an accident involving multiple vehicles.

Each of the collection unit 202, the identification unit 203, the ID information generation unit 204, the determination unit 206, the notification information generation unit 207, the notification unit 208, and the control processor 209 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the collection unit 202, the identification unit 203, the ID information generation unit 204, the determination unit 206, the notification information generation unit 207, the notification unit 208, and the control processor 209 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the collection unit 202, the identification unit 203, the ID information generation unit 204, the determination unit 206, the notification information generation unit 207, the notification unit 208, and the control processor 209 illustrated in FIG. 3.

The invention claimed is:

1. A server apparatus comprising:

a collection unit configured to collect accident information from a plurality of sources, the sources including at least one surrounding vehicle, at least one portable device, or both, the accident information including at least one of an image, audio data, position information, and time information;

an identification unit configured to identify an accident vehicle based on number information including a license plate number extracted from a number plate image of a damaged vehicle by analyzing, among the accident information, at least one of (i) images captured by imaging devices used in advanced driver-assistance systems of surrounding vehicles and (ii) drive recorder images of the surrounding vehicles;

an ID information generation unit configured to generate accident ID information associated with information regarding the identified accident vehicle, the generated accident ID information being assignable to accident information records that respectively (i) all vehicles involved in the accident, (ii) a subset of the vehicles, and (iii) only a single one of the vehicles;

a storage configured to hold a database in which the accident ID information and the accident information collected from the plurality of sources are associated with each other;

a determination unit configured to determine that the accident involves multiple vehicles when the database includes multiple records having identical accident ID information; and a notification unit configured to provide, in response to a request that includes the accident ID information, the accident information associated with the accident ID information to one or more requesters including one or more of an emergency notification center, an emergency life-saving organization requesting information, and an insurance company requesting information.

2. The server apparatus according to claim 1, further comprising a notification information generation unit configured to sort out the accident information collected and thereby generate notification information.

3. The server apparatus according to claim 1, wherein the information regarding the identified accident vehicle comprises one or both of a chassis frame number and a vehicle identification number.

4. The server apparatus according to claim 2, wherein the information regarding the identified accident vehicle comprises one or both of a chassis frame number and a vehicle identification number.

5. The server apparatus according to claim 1, wherein the database further comprises diagnostic information associated with the information regarding the identified accident vehicle.

6. A server apparatus comprising circuitry configured to:

collect accident information from a plurality of sources, the sources including at least one surrounding vehicle, at least one portable device, or both, the accident information including at least one of an image, audio data, position information, and time information;

identify an accident vehicle based on number information including a license plate number extracted from a number plate image of a damaged vehicle by analyzing, among the accident information, at least one of (i) images captured by imaging devices used in advanced driver-assistance systems of surrounding vehicles and (ii) drive recorder images of the surrounding vehicles;

generate accident ID information associated with information regarding the identified accident vehicle, the generated accident ID information being assignable to accident information records that respectively capture (i) all vehicles involved in the accident, (ii) a subset of the vehicles, and (iii) a single one of the vehicles;

store, in a storage, a database in which the accident ID information and the accident information are associated with each other;

determine that the accident involves multiple vehicles when the database includes multiple records having identical accident ID information; and provide, in response to a request that includes the accident ID information, the accident information associated with the accident ID information to one or more requesters including one or more of an emergency notification center, an emergency life-saving organization requesting information, and an insurance company requesting information.

7. The server apparatus according to claim 2, wherein the notification information generation unit is configured to sort out the accident information collected by removing duplicate pieces of accident information and combining multiple pieces of accident information.

8. The server apparatus according to claim 7, wherein the notification information generation unit is configured to generate the notification information including information regarding a number of vehicles involved in the accident and information regarding a number of injured persons involved in the accident.

9. The server apparatus according to claim 1, wherein the one or more requesters include at least one of the emergency life-saving organization and the insurance company, and the notification unit is configured to provide the accident information associated with the accident ID information when the at least one of the emergency life-saving organization and the insurance company presents the accident ID information obtained from the emergency notification center.

10. The server apparatus according to claim 1, wherein the ID information generation unit is configured to, when the accident involves one vehicle, regard multiple pieces of accident information obtained from a plurality of vehicles as one group and associate the one group with one accident ID information.

* * * * *